United States Patent [19]

Thunberg

[11] 4,391,321
[45] Jul. 5, 1983

[54] HEAT EXCHANGER IN PLANTS FOR VENTILATING ROOMS OR BUILDINGS

[76] Inventor: Svante Thunberg, Observatoriegatan 12, S-113 29 Stockholm, Sweden

[21] Appl. No.: 217,019
[22] PCT Filed: Mar. 21, 1980
[86] PCT No.: PCT/SE80/00085
§ 371 Date: Nov. 20, 1980
§ 102(e) Date: Nov. 20, 1980
[87] PCT Pub. No.: WO80/02064
PCT Pub. Date: Oct. 2, 1980

[30] Foreign Application Priority Data

Mar. 21, 1979 [SE] Sweden ............................ 7902549

[51] Int. Cl.³ .......................................... F24H 3/06
[52] U.S. Cl. .................................. 165/54; 98/33 R; 137/567; 137/877; 165/DIG. 12
[58] Field of Search ............... 165/53, 54, DIG. 12; 98/33 R; 137/567, 877

[56] References Cited

U.S. PATENT DOCUMENTS

| | | | |
|---|---|---|---|
| 850,784 | 4/1907 | Richmond | 165/54 |
| 1,825,498 | 9/1931 | Wogan | 165/54 X |
| 2,019,351 | 10/1935 | Lathrop | 165/54 X |
| 2,303,157 | 11/1942 | Bush | 165/53 |
| 3,500,655 | 3/1970 | Lyons | 62/325 X |
| 4,071,080 | 1/1978 | Bridgers | 165/DIG. 12 X |

FOREIGN PATENT DOCUMENTS

| | | |
|---|---|---|
| 1928160 | 12/1970 | Fed. Rep. of Germany ... 165/DIG. 12 |
| 2947432 | 5/1981 | Fed. Rep. of Germany ........ 165/54 |
| 746433 | 3/1956 | United Kingdom ............... 98/33 R |

Primary Examiner—William E. Tapolcai, Jr.
Attorney, Agent, or Firm—Cushman, Darby & Cushman

[57] ABSTRACT

A heat exchanger in combination with two duct system for bringing in relatively cold outside air into an enclosure while exhausting relatively warm room air from the enclosure. The heat exchanger is positioned so as to recover heat from the exhaust air into the incoming cold fresh air. A valving system switches the incoming cold air with the warm exhaust air in the flow paths of the heat exchanger. This solves the problem of moisture from the exhaust air condensing on the walls of the ducting system for the exhaust air.

2 Claims, 4 Drawing Figures

HEAT EXCHANGER IN PLANTS FOR VENTILATING ROOMS OR BUILDINGS

The present invention relates to a heat exchanger in plants for ventilating rooms and buildings and is of the kind disclosed in the preamble to the appended main claim.

The invention is primarily intended for air change between relatively cold outside air and relatively warm air e.g. in dwelling rooms, cowsheds, piggeries etc. The invention can also be utilized, however, for air change between relatively warm outside air and relatively cold inside air in storage rooms with low temperatures, such as refrigeration rooms.

The object of the invention is to provide a relatively simple and cheap heat exchanger which is primarily intended to reduce the problems occurring in heat exchangers known up to now, when the outside air is relatively cold in relation to the relatively warm inside air in dwelling rooms, for example.

In known heat exchangers of the kind in question, the hot exhaust air is passed through a recuperative heat exchanger in one and the same direction in a first duct system, while the relatively cold supply air is passed through a second duct system in the opposite direction in the heat exchanger. During this flow, the walls separating the duct systems are heated up while there is a transfer of heat from the heated surfaces of the separating walls to the supply air in its duct system.

In countries with a relatively cold climate, it has been found that during certain times of the year the water vapor in the exhaust air condenses in certain conditions and deposits itself as moisture or even frost or ice in the duct system for the exhaust air. This results in a considerable reduction of the heat exchanger efficiency and thereby a reduction of heat recovery from the exhaust air. Up to now, once has been compelled to use heat exchangers with relatively expensive equipment to lessen these drawbacks, but because of this the known heat exchangers have been given limited use for reasons of cost.

However, this problem is solved in a simple, effective and relatively cheap mode with a heat exchanger which, in accordance with the invention, has the characterizing features disclosed in the appended claims.

The inventive heat exchanger has two known duct systems separated by partition walls through which heat is transferred from the relatively warm air in one duct system to the relatively cold air in the other duct system. A simple valve means is arranged on the side of the heat exchanger which is connected to the exhaust air ducting, and where the supply air ducting starts from the heat exchanger, said valve means being adapted in accordance with the invention to shunt the exhaust air and supply air ducting connections between the two duct systems of the heat exchanger. The exhaust air from the dwelling room will thus be supplied through one and the same exhaust duct to the heat exchanger, the valve means steering the exhaust air into the first or the second duct system. On the other hand, the supply air is supplied to the dwelling through one and the same supply duct, which is connected to the second or the first duct system.

The valve means can be shunted with the aid of relatively simple control means sensing humidity and temperature of the inside and outside air and shunting the valve means for predetermined conditions. Shunting is thus done with a certain frequency. In a simplified alternative, the frequency can be adjusted to a desired, fixed value, so that the two phases in the heat exchange alternate between predetermined time intervals.

In the inventive heat exchanger, the exhaust air will thus flow through the first duct system in one phase, and through the second duct system in the other phase, simultaneously as the flow of supply air through the heat exchanger alternates in a corresponding way.

In contradistinction to previously known heat exchangers of the kind in question, the inventive heat exchanger permits the use of relatively large heat-transferring surfaces in the heat exchanger. If large heat-transferring surfaces are used, which is a desire for increasing heat recovery, there are substantial problems in known heat exchangers with condensed water vapor and frost formation on exposed parts during certain conditions, which result in considerable costs for special equipment in the known heat exchangers for solving these problems.

To illustrate the advantages of the heat exchanger in accordance with the invention, it can be compared with a conventional recuperative heat exchanger and a conventional regenerative heat exchanger. In the recuperative heat exchanger, heat transport through the partition walls between the two duct systems occurs, while in the regenerative heat exchanger a heat exchanger pack is warmed in a hot air stream to accumulate heat in the pack, which is subsequently moved into the cold air stream where the pack dissipates a part of its heat.

It can be said in short that the heat exchanger in accordance with the invention combines in an extremely simple way the two known main types of heat exchanger into a single heat exchanger, in accordance with the invention utilizing in both phases the principles for a recuperative heat exchanger with its relatively high efficiency and simultaneously resulting in that the partition walls function to a certain extent as heat accumulating and heat dissipating regenerative heat exchanger elements, said heated surfaces giving off heat for the avoidance of condensation of water vapor and possible frost or ice formation. When the heat energy in the exhaust air is transferred to one side of the partition walls, during the first or second phase, there is obtained a storage of heat in the partition walls simultaneously as there is a dissipation of heat to the cold supply air on the other side of the partition walls. If this recuperative heat exchange between the air streams in counterflow is maintained too long, which is the case in known heat exchangers, the temperature drop will be too great with resulting deteriorated efficiency and risk of condensation. By maintaining this condition, in accordance with the invention, solely during a predetermined period, and thereafter shunting the flow paths in the heat exchanger, an excessive temperature drop is avoided, as well as the risk of condensation.

In known heat exchangers, two separate heat exchangers must be used, each with its own pack of heat exchanger elements, in order to carry out shunting of hot exhaust air and cold supply air between two duct systems. In accordance with the invention, however, this sunting can be carried out in one and the same heat exchanger, which signifies a substantial decrease of manufacturing costs.

With regard to the valve means and the propulsion of exhaust air and supply air, a preferred embodiment of the invention is distinguished in that in each of the two ducts on one side of the heat exchanger there is a fan with reversible direction of rotation. The supply air and exhaust air ducts are joined to each other by crossing, but separated, branch ducts. In the ducts there are one-way valves which open and close in response to the pressure variations obtained when the direction of rotation of the fans is reversed. This means is thus of the nature that reversal of the direction of rotation of the fans controls the non-return valves in such a way that the exhaust air is shunted from the first duct system to the second simultaneously as supply air is shunted from the second duct system to the first duct system. The valve means is more closely described in the following.

The valve means can thus be formed in a very simple and cheap manner in accordance with the invention in this embodiment. Control of the rotational direction of the fans can also be provided with simple means to obtain the desired shunting of the air streams in the heat exchanger for predetermined conditions.

As examples of the state of the art, the heat exchangers illustrated in the Swedish Pat. Nos. 7400735-2, 157955, 141290 and 149359, the Swiss Pat. No. 294275 and the Norwegian Pat. No. 83730 are cited. Not one of these publications refers, however, to a heat exchanger which only has a single heat exchanger pack, which is made with two separate duct systems which can alternatingly be supplied with hot exhaust air or cold supply air in the manner proposed in accordance with the invention.

A suitable embodiment of a heat exchanger in accordance with the invention is shown schematically on the appended drawings and is described in the following.

FIG. 1 schematically illustrates a heat exchanger with a valve means in a first position.

Figure 3:
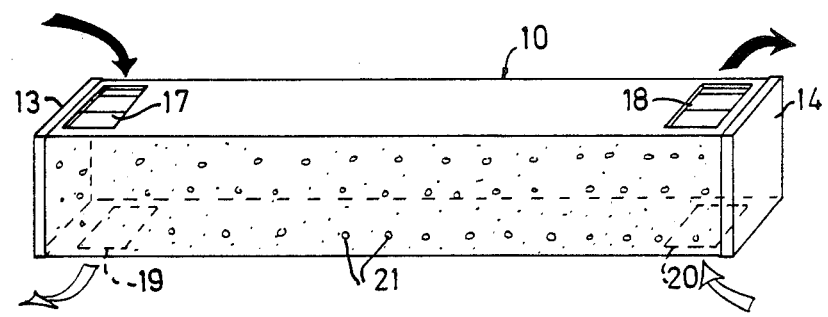
FIG. 3 is a schematic perspective view of the heat exchanger per se.
Figure 4:
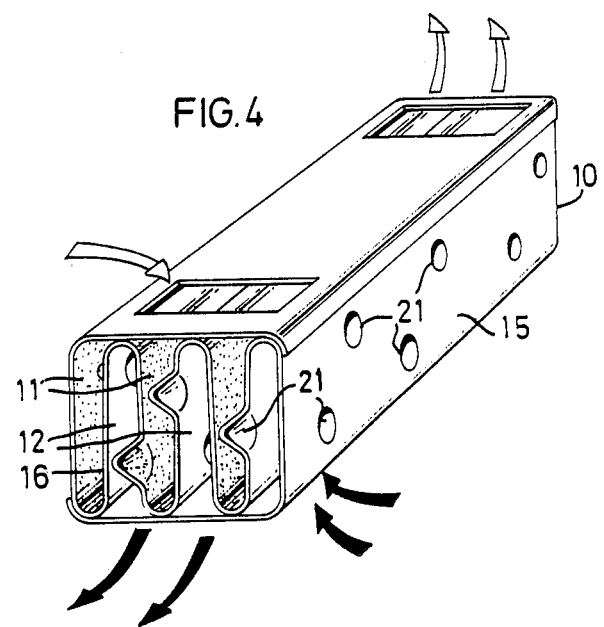
FIG. 4 is a fragmentary detail depiction of the heat exchanger in perspective.

The heat exchanger 10 itself, as illustrated in FIGS. 3 and 4, is of an extremely simple type. Sheet metal is pleated to form two separate systems of ducts 11,12. The two duct systems 11,12 are closed off at the ends by means of end walls 13,14. The sheet is wound round the pleated portions to form a casing 15 round the partition walls 16 before the end walls 13,14 are fitted sealingly against the ends of the walls 16.

Connection openings 17,18 are made in the upper side of the casing for the first duct system 11, as shown in FIGS. 3 and 4, while on the under side of the casing there are made connection openings 19,20 for the second duct system 12.

Small nodules or projections 21 are pressed into the pleated sheet to form spacing means between the partition walls 16, so that these can consist of relatively thin sheet but can still resist the forces which occur when the pressure in the two duct systems changes from excess pressure in the one and sub-pressure in the other to the reverse situation. The partition walls can accordingly resist alternating pressure without bending.

The heat exchanger 10 is arranged in a heated building 22 with an outer wall 23 against relatively cold outside air. An inner wall 24 between different rooms in the building is also indicated on the drawing.

The relatively warm interior air forms the exhaust air, and is taken off via a main duct 25, while heated supply air is brought into the building through another main duct 26 from the heat exchanger.

These two main ducts 25,26 are connected to the opening 18 of the first duct system and to the opening 20 of the second duct system at one end of the two duct systems.

At the openings 17 and 19, the opposite ends of the duct systems are connected to the outside air via ducts 27,28 through the wall 23.

Figure 1:
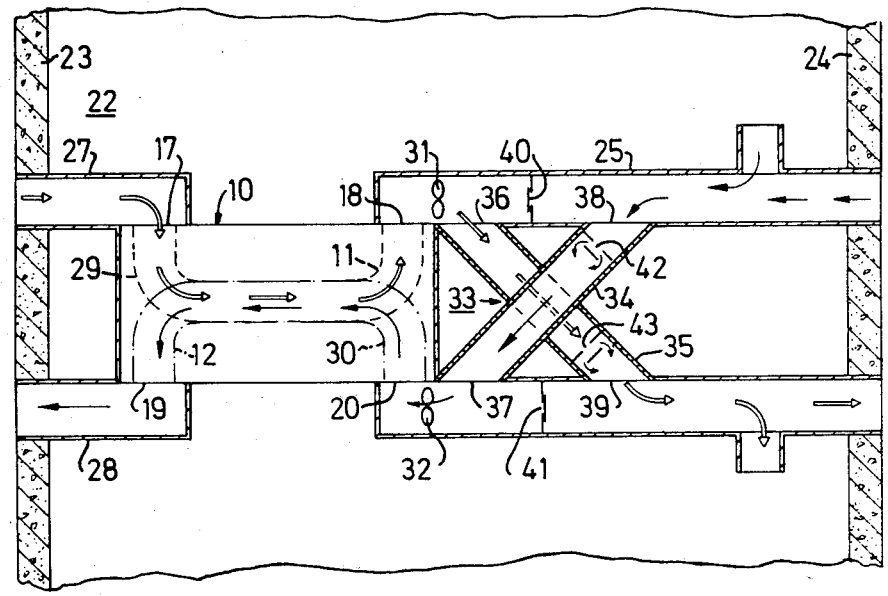

During one phase, the cold outside air flows through the first duct system 11, its flow path 29 through the heat exchanger between the openings 17,18 being indicated by means of dashed lines, while the flow path 30 for the warm inside air is indicated by chain-dotted lines between the openings 20 and 19 in FIG. 1.

The air stream in the first duct system 11 is driven by a fan 31, and the air stream in the second duct system 12 is driven by a second fan 32 during the first phase according to FIG. 1. As is illustrated, it is suitable that the fans are in the vicinity of the openings 18,20.

The working direction of the fans 31,32 is reversible, which is most simply achieved by using fans with reversible directions of rotation.

In the first phase, the fan 31 rotates such as to take supply air from the ambient atmosphere through the heat exchanger and press the supply air further into the building, simultaneously as the fan 32 rotates to extract exhaust air from the building and press exhaust air further through the heat exchanger to the ambient atmosphere.

Figure 2:
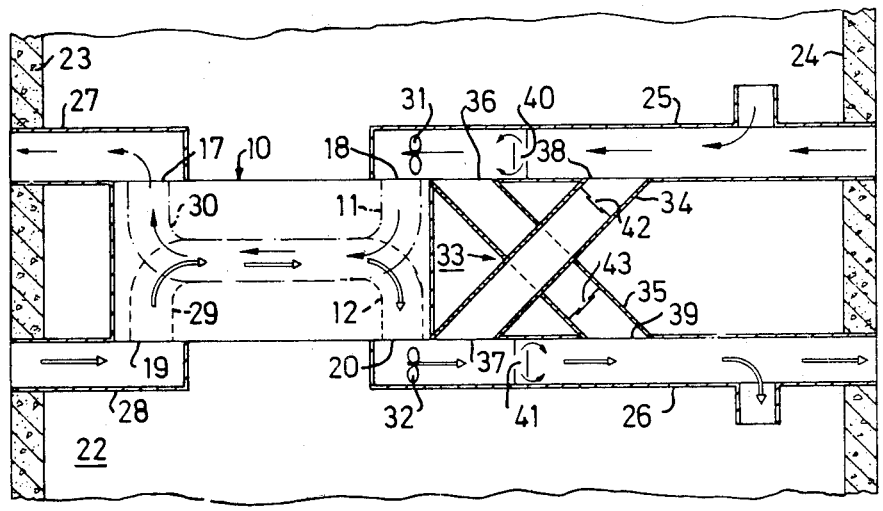
FIG. 2 shows the heat exchanger with the valve means in a second position.

To enable coupling over to the second phase, as illustrated in FIG. 2, there is a valve means 33 which is settable between two positions to provide both phases alternatingly after each other at a predetermined frequency.

The valve means comprises two branch ducts 34,35 which cross each other but are still separate, each extending from its forward connection 36,37 via the respective main duct 25 and 26, respectively to its rear connection 38,39 at the respective opposite main duct 26 and 25.

To obtain reversal of the flow paths in response to reversing the rotational directions of the fans 31,32 and thus an alteration in the pressure conditions, there are four non-return valves: one 40 and 41, respectively, in each main duct 25 and 26, respectively, between the front and rear connections of the branch ducts 34,35; and one 42 and 43, respectively, in each branch duct 34 and 35, respectively.

In the first-mentioned phase according to FIG. 1, the fan 31 provides excess pressure on one side of the valve 40 simultaneously as the fan 32 extracts air in the branch duct 34 and opens the valve 42 to extract exhaust air and press it through the second duct system. On the other side of the valve 40 there thus prevails a sub-pressure and the valve is kept closed.

The fan 31 sucks supply air through the first duct system and forces it further through the branch duct 35, so that the excess pressure in the air opens the valve 43 and forces the air further through the duct 26 into the building. The excess pressure in the duct 26 acts on one side of the valve 41 simultaneously as a sub-pressure prevails on the other side of the valve, resulting in that the valve is kept closed.

To change over to the second phase according to FIG. 2, all that is needed is to reverse the directions of rotation of the fans 31,32. This can suitably be done with conventional means of a very simple kind, which provide a periodic change-over with predetermined intervals for the two phases. The length of the intervals can be dependent on the temperature of the outside air and the temperature and humidity of the inside air.

After reversing the working direction of the fans to the second phase according to FIG. 2, the valves 40 and 41 in the main ducts are kept open, while the valves 42,43 in the branch ducts 34,35 are kept closed.

Exhaust air is now extracted from the building through the duct 25 to the fan 31 is fed through the first duct system 11, while the fan 32 sucks outside air through the second duct system 12 and feeds it further through the duct 26 into the building.

The valve means will thus be simple and can therefore be manufactured at relatively low cost.

Since the heat exchanger itself, according to FIG. 3, is simple and cheap, the cost of the plant including the valve means will be relatively low, in turn creating the opportunity of distributing a larger number of heat-regaining heat exchangers, e.g. for dwelling houses and cowsheds, with the object of reducing heat losses in ventilation.

If the heat exchanger in accordance with the invention is used for refrigerating rooms, for example, the conditions will be reversed, since the inside air in this case is relatively cold and the outside air usually has a higher temperature.

I claim:

1. In a ventilating system for a building: first and second duct systems separated by partition walls and arranged in heat-exchange relationship such that heat may be transmitted from air flowing through one duct system, through the partition walls, to air flowing through the other duct system; reversible fan means associated with each duct system for passing air through the two duct systems countercurrently; a first outside air duct placing one end of the first duct system in communication with outside air and a first inside air duct placing the other end of the first duct system in communication with inside air; a second outside air duct placing one end of the second duct system in communication with outside air and a second inside air duct placing the other end of the second duct system in communication with inside air; and valve means for controlling air flow including first and second branch ducts arranged in crossing relationship, each branch duct having a first end connected to said first inside air duct and a second end connected to said second inside air duct, a non-return valve in each said first and second inside air ducts at locations between the connections of the branch ducts to said first and second inside air ducts, and a non-return valve in each said branch duct, the arrangement being such that in one mode of fan operation outside air flows through said first outside air duct, said first duct system, said first branch duct and into said second inside air duct while inside air flows through said first inside air duct, said second branch duct, said second duct system into said second outside air duct, and in another mode of fan operation outside air flows through said second outside air duct, said second duct system into said second inside air duct while inside air flows through said first inside air duct, said first duct system into said first outside air duct.

2. A ventilating system as in claim 1 wherein during operation in said first mode the non-return valve in each said inside air duct has a closed position and the non-return valve in each said branch duct has an open position, and wherein during operation in said second mode the non-return valve in each said inside air duct has an open position and the non-return valve in each said branch duct has a closed position.

* * * * *